(12) United States Patent
Honda

(10) Patent No.: US 10,787,046 B2
(45) Date of Patent: Sep. 29, 2020

(54) TIRE MOUNT POSITION DETECTION SYSTEM, TIRE MOUNT POSITION DETECTION METHOD, AND TIRE MOUNT POSITION DETECTION PROGRAM

(71) Applicant: BRIDGESTONE CORPORATION, Tokyo (JP)

(72) Inventor: Kyohei Honda, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 16/622,091

(22) PCT Filed: Jun. 13, 2018

(86) PCT No.: PCT/JP2018/022537
§ 371 (c)(1),
(2) Date: Dec. 12, 2019

(87) PCT Pub. No.: WO2018/230594
PCT Pub. Date: Dec. 20, 2018

(65) Prior Publication Data
US 2020/0180370 A1 Jun. 11, 2020

(30) Foreign Application Priority Data

Jun. 13, 2017 (JP) .................. 2017-115996
Dec. 15, 2017 (JP) .................. 2017-240515

(51) Int. Cl.
*B60C 23/04* (2006.01)
*G01S 5/02* (2010.01)

(52) U.S. Cl.
CPC ........ *B60C 23/0416* (2013.01); *B60C 23/045* (2013.01); *B60C 23/0444* (2013.01); *G01S 5/0252* (2013.01)

(58) Field of Classification Search
CPC ........... B60C 23/0416; B60C 23/0444; B60C 23/045; B60C 23/0408; G01S 5/0252
(Continued)

(56) References Cited

U.S. PATENT DOCUMENTS 6,446,502 B1 * 9/2002 Normann ............ B60C 23/0416
73/146.5
6,877,370 B2 * 4/2005 Masudaya ........... B60C 23/0416
340/442
(Continued)

FOREIGN PATENT DOCUMENTS

JP  2007-045201 A  2/2007
JP  2009-214708 A  9/2009
(Continued)

OTHER PUBLICATIONS

International Search Report for PCT/JP2018/022537 dated, Aug. 21, 2018 (PCT/ISA/210).

*Primary Examiner* — Eric Blount
(74) *Attorney, Agent, or Firm* — Sughrue Mion, PLLC

(57) ABSTRACT

A tire mount position detection system measures a first signal intensity, which is intensity of a radio signal received by a first receiver (R1), and a second signal intensity, which is intensity of a radio signal received by a second receiver (R2), for each transmitter, and calculates a total value of the first signal intensity and the second signal intensity for each transmitter. The tire mount position detection system detects the wheel position to which a tire having the transmitter is mounted, based on the first signal intensity, the second signal intensity, and the total value of each transmitter.

12 Claims, 9 Drawing Sheets

(58) Field of Classification Search
USPC .......................................................... 340/445
See application file for complete search history.

(56) References Cited

U.S. PATENT DOCUMENTS

| | | | | |
|---|---|---|---|---|
| 7,385,494 | B2* | 6/2008 | Mori | ................... B60C 23/0416 340/438 |
| 7,825,788 | B2* | 11/2010 | Mori | ................... B60C 23/0416 340/447 |
| 8,031,065 | B2* | 10/2011 | Tanaka | ................ B60C 23/0416 340/442 |
| 8,686,846 | B2* | 4/2014 | Kanenari | ............... B60C 23/007 152/151 |
| 9,469,166 | B2* | 10/2016 | McIntyre | ............... B60C 23/007 |
| 2009/0231115 | A1* | 9/2009 | Tanaka | ................ B60C 23/0444 340/447 |
| 2010/0214088 | A1* | 8/2010 | Lange | .................... G01S 5/0252 340/447 |
| 2010/0328058 | A1* | 12/2010 | Kanenari | ............ B60C 23/0401 340/447 |
| 2012/0323529 | A1* | 12/2012 | Kessler | ............... B60C 23/0416 702/179 |
| 2014/0085068 | A1* | 3/2014 | Kosugi | ............... B60C 23/0416 340/447 |

FOREIGN PATENT DOCUMENTS

| | | | |
|---|---|---|---|
| JP | 2011-005999 | A | 1/2011 |
| JP | 2013-001219 | A | 1/2013 |
| JP | 2014-015123 | A | 1/2014 |

* cited by examiner

| SENOR ID | R1 | R2 | R1+R2 |
|---|---|---|---|
| a | 2.48 | 2.41 | 4.9 |
| b | 2.28 | 2.55 | 4.8 |
| c | 2.21 | 2.06 | 4.3 |
| d | 2.28 | 2.22 | 4.5 |
| e | 2.08 | 2.43 | 4.5 |
| f | 1.93 | 2.44 | 4.4 |

REGION α (rows a, b)
REGION β (rows d, e)

FIG. 8

|   | R1 | R2 | R1+R2 | R1/R2 | POSITION |
|---|---|---|---|---|---|
| a | 2.52 | 2.45 | 4.96 | 1.03 | 1 |
| b | 2.32 | 2.60 | 4.93 | 0.89 | 2 |
| c | 2.33 | 2.08 | 4.41 | 1.12 | 3 |
| d | 2.33 | 2.18 | 4.50 | 1.07 | 4 |
| e | 1.99 | 2.01 | 4.00 | 0.99 | 5 |
| f | 2.08 | 2.27 | 4.35 | 0.92 | 6 |

TIRE MOUNT POSITION DETECTION SYSTEM, TIRE MOUNT POSITION DETECTION METHOD, AND TIRE MOUNT POSITION DETECTION PROGRAM

CROSS REFERENCE TO RELATED APPLICATIONS

This application is a National Stage of International Application No. PCT/JP2018/022537 filed Jun. 13, 2018, claiming priority based on Japanese Patent Application No. 2017-115996, filed Jun. 13, 2017 and Japanese Patent Application No. 2017-240515 filed Dec. 15, 2017.

TECHNICAL FIELD

The present invention relates to a tire mount position detection system, a tire mount position detection method, and a tire mount position detection program detecting that each tire, which includes a transmitter, is mounted to which wheel position of a vehicle.

BACKGROUND ART

In order to measure inner pressure or temperature of a tire mounted to a vehicle (here, it denotes a tire mounted to a rim wheel), it is known that a sensor including a transmitter of a radio signal (radio wave) is mounted in the tire.

The information detected by the sensor should be managed to correspond with the wheel position (right front wheel, left rear wheel, or the like) of the vehicle to which the tire is mounted. However, the wheel position to which the tire (sensor) is mounted is switched due to a rotation of the tires, and therefore the data relating to the correspondence between an identifier (ID) of the sensor and the wheel position should be updated as needed.

A method that automatically detects the wheel position to which the tire (sensor) is to be mounted, is known in order to avoid such an update to be complicated. For example, a tire pressure monitoring system disclosed in Patent Literature 1 has two receivers in a front-rear direction of a vehicle so as to automatically detect a wheel position to which the tire (sensor) is mounted, by using the sensor mounted in the tire to detect a rotation direction of the tire.

CITATION LIST

Patent Literature

[PTL 1] Japanese Unexamined Patent Application Publication No. 2007-045201

SUMMARY OF INVENTION

However, in the tire pressure monitoring system described above, the sensor that detects the rotation direction is additionally arranged for detecting the wheel position to which the tire (sensor) is mounted. Such an additional sensor leads an increase of cost and a failure rate of the system, and therefore the arranging of the additional sensor should be avoided as much as possible.

Accordingly, an object of the present invention is, in consideration of the problem described above, to provide a tire mount position detection system, a tire mount position detection method, and a tire mount position detection program capable of automatically detecting a wheel position to which a tire (sensor) is mounted, based only on a receiving state of a radio signal transmitted by a transmitter.

One aspect of the present invention is a tire mount position detection system (tire mount position detection system 100) that detects each tire (tires 31 to 36) having a transmitter (sensors 41 to 46) is mounted to which wheel position in a vehicle (vehicle 10). The tire mount position detection includes a receiver unit (receiver unit 105) arranged in the vehicle to receive a radio signal transmitted by the transmitter, the receiver unit including at least a first receiver (receiver 110), and a second receiver (receiver 120) arranged at a position different from a position of the first receiver, a first measurement portion (first measurement portion 210) that measures first signal intensity (for example, $R1(a)$), which is intensity of the radio signal received by the first receiver, for each transmitter, a second measurement portion (second measurement portion 220) that measures second signal intensity (for example, $R2(a)$), which is intensity of the radio signal received by the second receiver, for each transmitter, a calculation portion (signal intensity calculation portion 230) that calculates a total value (for example, $R1(a)+R2(a)$) of the first signal intensity and the second signal intensity, for each transmitter, and a position detection portion (position detection portion 250) that detects the wheel position to which the tire having the transmitter is mounted, based on the first signal intensity, the second signal intensity, and the total value of each transmitter.

Other aspect of the present invention is a tire mount position detection method that detects each tire having a transmitter is mounted to which wheel position in a vehicle. The tire mount position detection method includes, by using a receiver unit arranged in the vehicle to receive a radio signal transmitted by the transmitter, the receiver unit including at least a first receiver, and a second receiver arranged at a position different from a position of the first receiver, measuring first signal intensity, which is intensity of the radio signal received by the first receiver, for each transmitter. measuring second signal intensity, which is intensity of the radio signal received by the second receiver, for each transmitter, calculating a total value of the first signal intensity and the second signal intensity, for each transmitter, and detecting the wheel position to which the tire having the transmitter is mounted, based on the first signal intensity, the second signal intensity, and the total value of each transmitter.

Another aspect of the present invention is a tire mount position detection program that detects each tire having a transmitter is mounted to which wheel position in a vehicle, the vehicle including a receiver unit arranged in the vehicle to receive a radio signal transmitted by the transmitter, the receiver unit including at least a first receiver, and a second receiver arranged at a position different from a position of the first receiver. The tire mount position detection program causes a computer to execute a process that measures first signal intensity, which is intensity of the radio signal received by the first receiver, for each transmitter, a process that measures second signal intensity, which is intensity of the radio signal received by the second receiver, for each transmitter, a process that calculates a total value of the first signal intensity and the second signal intensity, for each transmitter, and a process that detects the wheel position to which the tire having the transmitter is mounted, based on the first signal intensity, the second signal intensity, and the total value of each transmitter.

BRIEF DESCRIPTION OF DRAWINGS

FIG. 8 is a graph illustrating an example (second embodiment) of measured intensity of radio signals and the calculation result.

DESCRIPTION OF EMBODIMENTS

Hereinafter, embodiments will be described with reference to the drawings. The same reference signs or similar reference signs are assigned to the same functions or the same components and the description thereof is omitted as needed.

Figure 1:
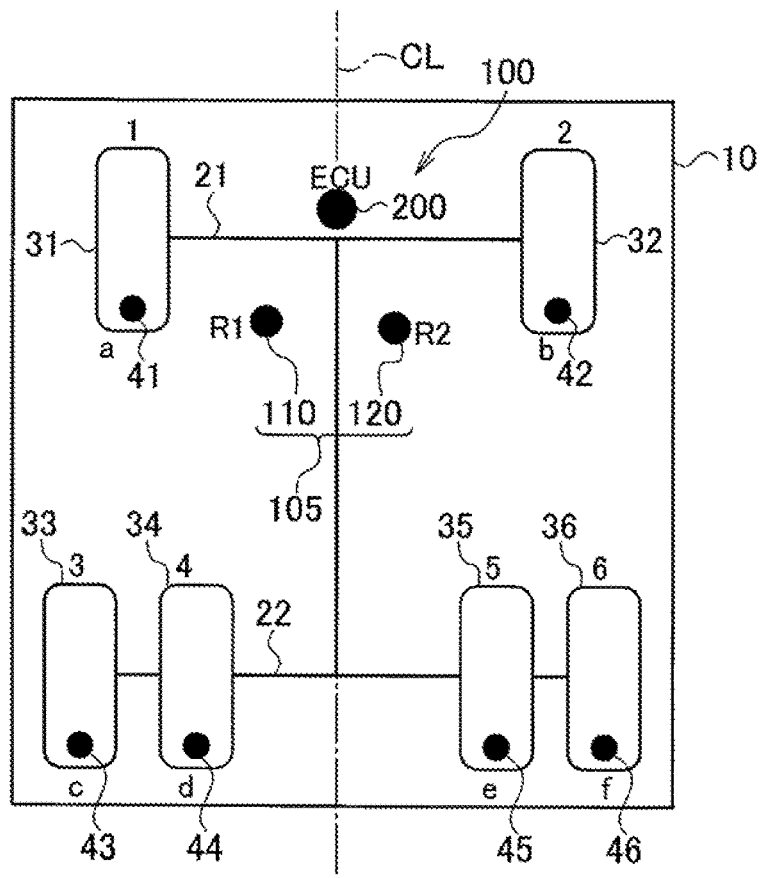
FIG. 1 is a schematic plane view of a vehicle 10 including a tire mount position detection system 100.

First Embodiment (1) Schematic Configuration of Vehicle Including Tire Mount Position Detection System FIG. 1 is a schematic plane view of a vehicle 10 including a tire mount position detection system 100. As shown in FIG. 1, the vehicle 10 is formed as a car provided with a front axle 21 and a rear axle 22. A type of the vehicle is not especially limited, however a large vehicle such as a truck and a mine vehicle having a so-called double tire mounted to the rear axle 22 may be mainly considered.

Tires 31 to 36 are mounted to the vehicle 10. Each of the tires 31 to 36 is formed as a tire mounted to a rim wheel (it may be called a tire wheel assembly).

Here, the tire 31 is mounted to a position of a left front wheel (position 1 in the figure, the same hereinafter). Similarly, the tires 32 to 36 are mounted to positions of a right front wheel 2, a left rear outer wheel 3, a left rear inner wheel 4, a right rear inner wheel 5, and a right rear outer wheel 6, respectively.

A sensor 41 that measures inner pressure and temperature of the tire 31 is mounted to the tire 31. The sensor 41 may include a sensor that measures acceleration. The sensor 41 includes a transmitter that transmits data of the measured inner pressure and temperature. Similarly, sensors 42 to 46 are mounted to the tires 32 to 36, respectively. Each of the sensors 41 to 46 can be suitably used for a tire pressure monitoring system (TPMS) or the like.

An identifier "a" that identifies the sensor 41 (transmitter) is assigned to the sensor 41 as a sensor ID. Similarly, identifiers "b" to "f" are assigned to the sensors 42 to 46, respectively as sensor IDs.

The tire mount position detection system 100 detects that each of the tires 31 to 36 to which the sensors (transmitters) 41 to 46 are mounted, is mounted to which wheel position (positions 1 to 6 in the figure) of the vehicle 10.

The tire mount position detection system 100 includes a receiver unit 105 and a position detection device 200. The receiver unit 105 is arranged in the vehicle 10 so as to receive the radio signals (radio wave) transmitted by the sensors 41 to 46 (transmitters).

In the present embodiment, the receiver unit 105 is formed by a receiver 110 and a receiver 120. In the present embodiment, the receiver 110 is served as a first receiver. Further, the receiver 120 is served as a second receiver.

The receiver 110 is described as "R1" as needed, for convenience of description. The receiver 110 receives the radio signals transmitted by the sensors (transmitters), namely the sensors 41 to 46. Here, intensity (transmission power) and a frequency band of the radio signal may be different depending on a use area of the tire mount position detection system 100 or a type of the vehicle 10.

The receiver 120 is described as "R2" as needed, for convenience of description. The receiver 120 also receives the radio signals transmitted by the sensors 41 to 46. The receiver 120 is arranged at a position different from that of the receiver 110.

In the present embodiment, the receiver 110 is arranged at one side with respect to a center line CL between the left wheel (for example, position 1) and a right wheel (for example, position 2). The receiver 120 is arranged at another side with respect to the center line CL.

In the present embodiment, the receiver 110 is arranged at a position whose distances from respective axles of the vehicle 10, specifically distances from the front axle 21 and the rear axle 22, are different to each other. That is, it is preferable that the receiver 110 is not arranged at a position whose distances from the front axle 21 and the rear axle 22 are identical to each other. Similarly, the receiver 120 is also arranged at a position whose distances from the front axle 21 and the rear axle 22 are different to each other.

The position detection device 200 detects the wheel positions (positions 1 to 6) to which the tires 31 to 36, namely the sensors 41 to 46 are mounted, by using the receiver unit 105. In the present embodiment, the position detection device 200 is installed as a part of an electronic control unit (ECU) mounted to the vehicle 10. Here, as described below, a function achieved by the position detection device 200 may be arranged at an outside (crowd server or the like) of the vehicle 10, connected via a communication network.

(2) Functional Block Configuration of Tire Mount Position Detection System

Next, a functional block configuration of the tire mount position detection system 100 will be described. Specifically, a functional block configuration of the position detection device 200 forming the tire mount position detection system 100 is described.

Figure 2:
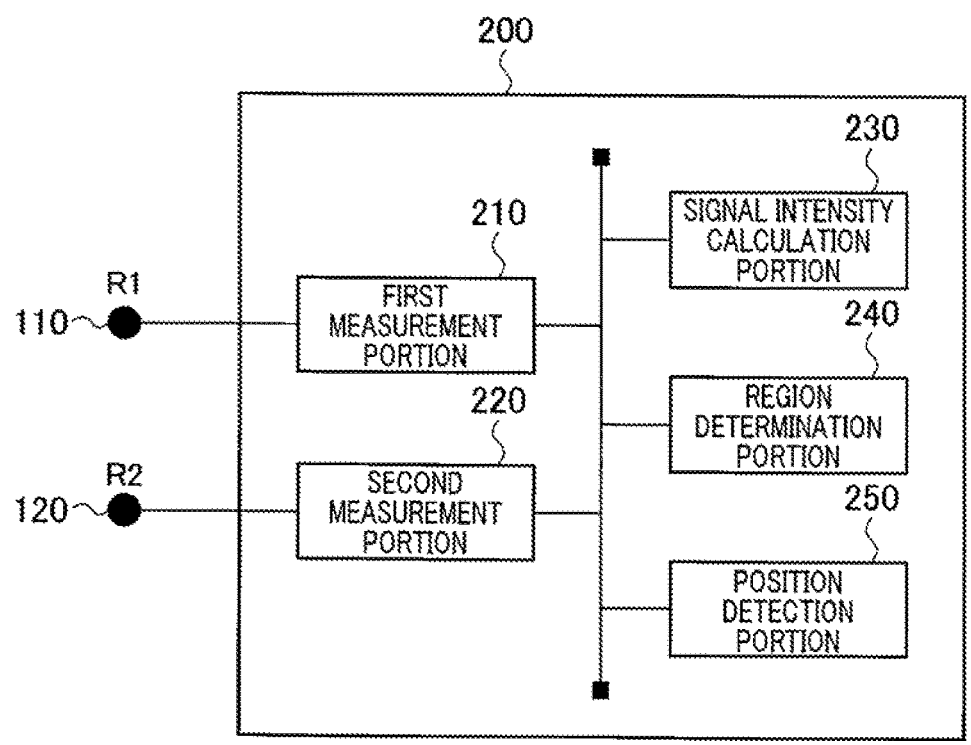
FIG. 2 is a functional block diagram of a position detection device 200.

FIG. 2 is the functional block diagram of the position detection device 200. As shown in FIG. 2, the position detection device 200 is provided with a first measurement portion 210, a second measurement portion 220, a signal intensity calculation portion 230, a region determination portion 240, and a position detection portion 250.

The position detection device 200 includes hardware such as a CPU and a memory, and the functional portions described above can be achieved by executing a computer program (software) on the hardware.

The first measurement portion 210 is connected to the receiver 110. The first measurement portion 210 measures the intensity (first signal intensity) of the radio signals received by the receiver 110, for each of the sensors (transmitters) 41 to 46.

The second measurement portion 220 is connected to the receiver 120. The second measurement portion 220 measures the intensity (second signal intensity) of the radio signals received by the receiver 120, for each of the sensors (transmitters) 41 to 46.

Hereinafter, a signal, which is transmitted from the sensor 41 (sensor ID: a), received by the receiver 110 (first receiver) is described as R1($a$). Similarly a signal, which is transmitted from the sensor 41 (sensor ID: a), received by the receiver 120 (second receiver) is described as R2($a$) (the same shall be applied to other sensors).

The intensity of the radio signal which is a measurement target of the first measurement portion 210 and the second measurement portion 220 may be a voltage level or a power level. Or alternatively, the intensity of the radio signal may be a value with a unit of decibel (dB). In the present embodiment, the voltage level (unit of V) is adopted.

Further, in the present embodiment, each of the radio signals transmitted by the sensors 41 to 46 includes the sensor ID (identifier) that identifies each sensor (transmitter).

The signal intensity calculation portion 230 executes a calculation using the intensity of the radio signals measured by the first measurement portion 210 and the second measurement portion 220.

Specifically, the signal intensity calculation portion 230 calculates a total value (sum) of the intensity (first signal intensity) of the radio signal received by the receiver 110 and the intensity (second signal intensity) of the radio signal received by the receiver 120, for each sensor. In the present embodiment, the signal intensity calculation portion 230 is served as a calculation portion.

More specifically, the signal intensity calculation portion 230 calculates the total value (R1+R2) of the signal intensity described below.
Formula 1
R1($a$)+R2($a$)
R1($b$)+R2($b$)
R1($c$)+R2($c$)
R1($d$)+R2($d$)
R1($e$)+R2($e$)
R1($f$)+R2($f$)

Figures 5, 6:
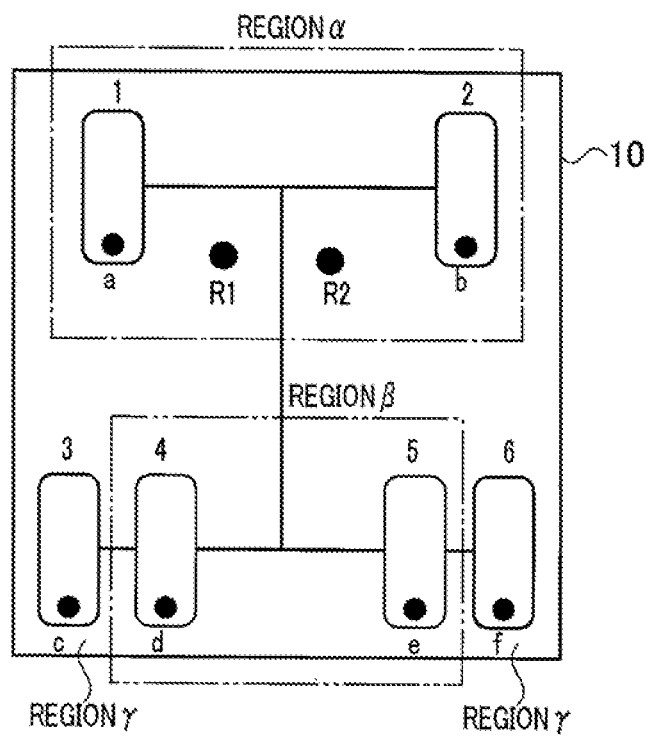
FIG. 5 is a graph illustrating an example (first embodiment) of total values (R1+R2) of measured intensity of radio signals.
FIG. 6 is a view illustrating a region for determining a position of the sensor in the vehicle 10.

FIG. 5 is a graph illustrating an example of the total values (R1+R2) of measured intensity of the radio signals. The signal intensity calculation portion 230 calculates the total value (R1+R2) shown in FIG. 5, for each sensor. The content of FIG. 5 is further described below.

The region determination portion 240 determines that each sensor is located in which region in the vehicle 10, based on a magnitude relation between the total values (R1+R2) of the signal intensity calculated by the signal intensity calculation portion 230. That is, the region determination portion 240 specifies an approximate position of each sensor in the vehicle 10, based on the magnitude relation between the total values.

Specifically, the region determination portion 240 determines that each sensor (transmitter) is located in which region in a front-rear direction and a left-right direction of the vehicle 10. That is, the region determination portion 240 determines that each sensor is located in which region in a plane view of the vehicle 10 shown in FIG. 1.

FIG. 6 is a view illustrating the region for determining the position of the sensor in the vehicle 10. As shown in FIG. 6, a region α, a region β, and a region γ are formed in the vehicle 10. The region α includes the wheel positions 1 and 2 (left front wheel and right front wheel). The region β includes the wheel positions 4 and 5 (left rear inner wheel and right rear inner wheel). The region γ is a region other than the region α and the region β, namely the region γ includes the wheel positions 3 and 6, (left rear outer wheel and right rear outer wheel).

The region determination portion 240 determines that which sensor is located in which region, based on the magnitude relation between the total values (R1+R2) shown in FIG. 5. As shown in FIG. 5, it is determined that the sensors having the sensor IDs a and b (sensors 41 and 42), which have large total values, are located in the region α. That is, it is based on a premise that the receiver unit 105 (receiver 110 and receiver 120) is arranged closer to the front axle 21 and the intensity of the radio signals transmitted from the wheel positions 1 and 2 (left front wheel and right front wheel) is larger than the intensity of the radio signals transmitted from other wheel positions.

Further, it is determined that the sensors having the sensor IDs d and e (sensors 44 and 45), which have the total values the second largest to the total values of the sensors having the sensor IDs a and b, are located in the region β. As described above, it is based on a premise that the receiver unit 105 is arranged closer to the front axle 21 and the intensity of the radio signals transmitted from the wheel positions 4 and 5 is smaller than the intensity of the radio signals transmitted from the wheel positions 1 and 2 and is larger than the intensity of the radio signals transmitted from the wheel positions 3 and 6. As a result, it is determined that the sensors having the sensor IDs c and f (sensors 43 and 46) are located in the region γ.

The position detection portion 250 detects the wheel position of the tire to which the sensor (transmitter) is mounted. Specifically, the position detection portion 250 detects each of the wheel positions of the tires 31 to 36 to which the sensors 41 to 46 are mounted respectively.

The position detection portion 250 detects the wheel position of the tire to which the sensor is mounted, based on the intensity (first signal intensity) of the radio signal received by the receiver 110, the intensity (second signal intensity) of the radio signal received by the receiver 120, and the total value (R1+R2) described above. Specifically, the position detection portion 250 detects the wheel position of the tire to which the sensor is mounted, based on the first signal intensity, the second signal intensity and the total value of each sensor.

More specifically, the position detection portion 250 detects that the sensor is mounted to which wheel position within the region (regions α, β, or γ) that the sensor is located determined by the region determination portion 240 based on the total value (R1+R2).

For example, the position detection portion 250 detects that the tire 31 to which the sensor 41 (sensor ID: a) is mounted, is mounted to the wheel position 1 within the region (region α), based on the magnitude relation between the first signal intensity (R1($a$)) and the second signal intensity (R2($a$)). The position detection portion 250 detects that other sensor (tire) is mounted to which wheel position, by means of a similar procedure. A more specific detection method of the wheel position is described below in detail.

Further, the position detection portion 250 is formed to be able to precisely detect the wheel position to which the sensor (tire) is mounted, even in a case in which the receiver 110 or the receiver 120 does not work normally due to its failure or the like.

Specifically, in a case in which the magnitude relation between the first signal intensity (R1($a$)) and the second signal intensity (R2($a$)) of the radio signal transmitted by the sensor 41 (first transmitter) mounted to a predetermined wheel position (for example, position 1) is similar to the magnitude relation between the first signal intensity (R1($b$)) and the second signal intensity (R2($b$)) of the radio signal transmitted by the sensor 42 (second transmitter) mounted to a wheel position (for example, position 2) opposite to the predetermined wheel position in the left-right direction or the front-rear direction of the vehicle, the position detection portion 250 detects the wheel position to which the sensor is mounted, based on a difference between the first signal intensity and the second signal intensity.

Hereinafter, a case in which the receiver 110 can normally receive a radio signal, while the receiver 120 cannot normally receive a radio signal because the sensitivity of the receiver 120 is deteriorated or the intensity of the radio signal is decreased due to the deterioration of the transmission environment of the radio signal, will be described.

When the receiver 110 and the receiver 120 can normally receive the radio signal, R1($a$)>R2($a$) is fulfilled with respect to the radio signal transmitted by the sensor 41 (sensor ID: a) because of their positional relation (in a case of no difference in the path loss between the sensor and the receiver). While, R1($b$)<R2($b$) is fulfilled with respect to the radio signal transmitted by the sensor 42 (sensor ID: b) because of their positional relation.

However, when the intensity of the radio signal received by the receiver 120 is largely decreased due to the failure described above, a case in which R1($a$)>R2($a$) and R1($b$)>R2($b$) are fulfilled might occur. The detection in such a case will be described in accordance with the example described above. That is, the position detection portion 250 detects the wheel positions to which the tire having the sensor 41 (first transmitter) and the tire having the sensor 42 (second transmitter) are mounted, by using the signal intensity of the transmitter in which the difference between the first signal intensity (R1($a$), R1($b$)) and the second signal intensity (R2($a$), R2($b$)) among the receiver 110 and the receiver 120 is larger.

Specifically, the position detection portion 250 calculates R1($a$)−R2($a$) and R1($b$)−R2($b$), and then the position detection portion 250 detects the wheel position to which the sensor is mounted, by using the signal intensity of the transmitter (sensor ID: a or b) in which the difference is larger. A more specific example will be described below.

(3) Operation of Tire Mount Position Detection System

Next, operation of the tire mount position detection system 100 described above will be described. Specifically, an initial setting operation, a tire (sensor) position detection operation, and an operation in a measurement failure of the tire mount position detection system 100 will be described.

(3.1) Initial Setting Operation

Figure 3:
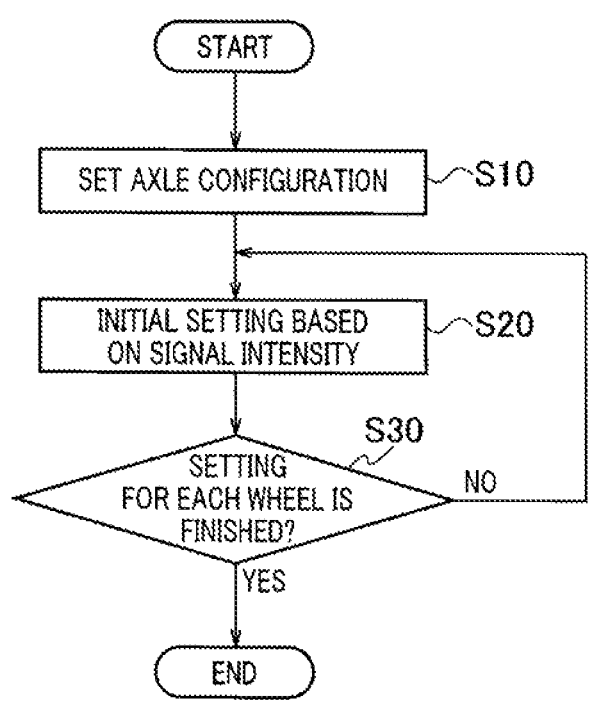
FIG. 3 is a flow chart illustrating a flow of an initial setting operation of the tire mount position detection system 100.

FIG. 3 is a flow chart illustrating a flow of the initial setting operation of the tire mount position detection system 100. As shown in FIG. 3, firstly, a basic configuration of the vehicle 10 to which the tire mount position detection system 100 is mounted is set. Specifically, an axle configuration of the vehicle 10 is set (S10). The axle configuration includes information relating to the number of axles of the vehicle 10, the presence or absence of a double tire, the number of the tires, and the like.

Secondly, an initial setting of the regions α, β, and γ, which correspond to the number of the receivers and the positions of the receivers arranged in the vehicle 10, shown in FIG. 6 is executed based the received signal intensity of the radio signal transmitted from each wheel position (S20).

Specifically, the signal intensity corresponding to the regions α, β, and γ is set based the received signal intensity of the radio signal transmitted from each wheel position. In particular, the signal intensity is largely changed depending on a body structure of the vehicle 10, and a type, a size and a position of a component (for example, fuel tank) to be mounted. Thus, the signal intensity, which is standard in each region, is adjusted based on such a transmission environment.

The initial setting of the signal intensity described above is repeatedly executed for each wheel, and thereafter the setting operation is ended (S30).

(3.2) Tire (Sensor) Position Detection Operation

Figure 4:
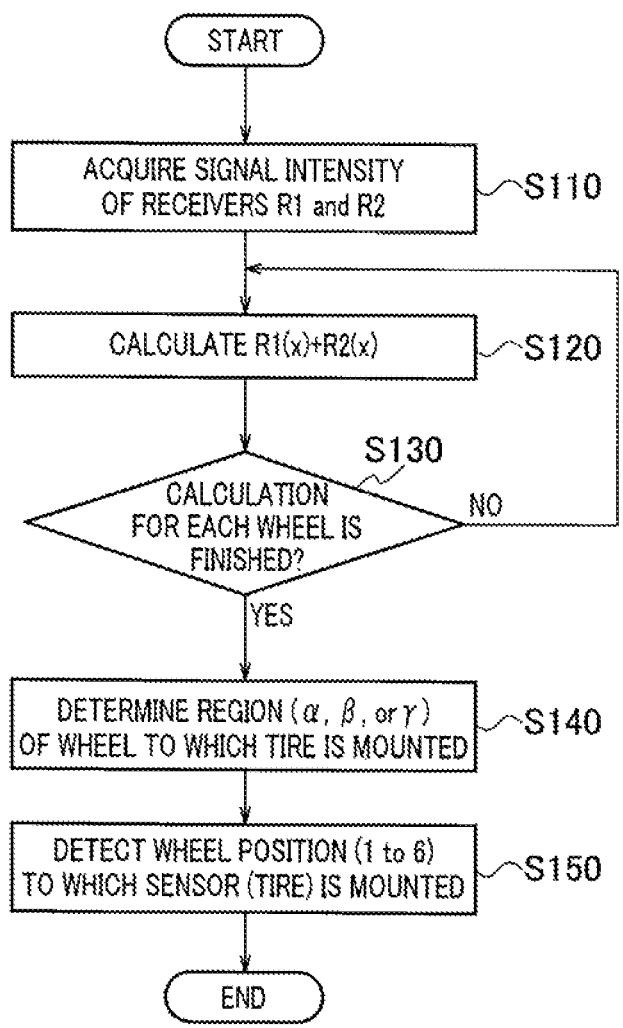
FIG. 4 is a flow chart illustrating a flow of a tire (sensor) position detection operation (first embodiment) of the tire mount position detection system 100.

FIG. 4 is a flow chart illustrating a flow of the tire (sensor) position detection operation of the tire mount position detection system 100. As shown in FIG. 4, the tire mount position detection system 100 acquires the signal intensity of the radio signal, which is transmitted by each sensor, received by the receiver R1 and the receiver R2 (S110).

The tire mount position detection system 100 calculates the total value of the signal intensity of the radio signal received by the receiver R1 and the signal intensity of the radio signal received by the receiver R2, for each sensor (S120). Here, the total value is described as R1($x$)+R2($x$) (x denotes the sensor ID). The tire mount position detection system 100 repeats the calculation of the total value for each wheel (S130).

In this way, the tire mount position detection system 100 uses two characteristics of the received signal intensity of the receivers R1 and R2 in order to detect the position of the tire (specifically, the position of the sensor in the tire). Firstly, the tire mount position detection system 100 determines an approximate position of the sensors 41 to 46 (sensor IDs: a to f) by using the first characteristic.

Since the received intensity of the radio signal (radio wave) is smaller as being far away from a transmission source, for example, the value of R1($a$) denotes "proximity between the sensor 41 (sensor ID: a) and the receiver R1". Further, since the receiver R1 and the receiver R2 are arranged to be aligned at a front center part of the vehicle 10, R1($a$)+R2($a$) denotes "proximity between the sensor 41 (sensor ID: a) and the front center part of the vehicle 10".

As shown in FIG. 5, the value of R1($x$)+R2($x$) (total value), which is "the sum of the received intensity", is classified into three groups. Based on the configuration that the sensors 41 to 46 (sensor IDs: a to f) are installed (mounted) to the tires 31 to 36, the three groups correspond to three regions α, β, and γ depending on the distances from the receivers R1 and R2 (see FIG. 6). This is the first characteristic.

The tire mount position detection system 100 determines that each sensor is located in which region α, β, or γ, based on the calculation result of the total value (S140).

As shown in FIG. 5, the tire mount position detection system 100 determines that the sensor 41 (sensor ID: a, total value: 4.9 V) and the sensor 42 (sensor ID: b, total value: 4.8 V) of the group having the largest total value are located in the region α.

Next, the tire mount position detection system 100 determines that the sensor 44 (sensor ID: d, total value: 4.5 V) and the sensor 45 (sensor ID: e, total value: 4.5 V) of the group having the second largest total value are located in the region β.

Further, the tire mount position detection system 100 determines that the sensor 43 (sensor ID: c, total value: 4.3 V) and the sensor 46 (sensor ID: f, total value: 4.4 V) of the group having a small total value are located in the region γ.

The tire mount position detection system 100 detects the wheel position (positions 1 to 6) to which the sensor (tire) is mounted, for each sensor (S150).

Specifically, the tire mount position detection system 100 detects that the sensor is mounted to which wheel position within each region (region α, β, or γ) shown in FIG. 6. For example, as shown in FIG. 5, regarding the sensor 41 (sensor ID: a), when R1(a) and R2(a) are compared, R1(a)>R2(a) is fulfilled in region α. On the other hand, regarding the sensor 42 (sensor ID: b), R1(b)<R2(b) is fulfilled in the region α.

This denotes that "the sensor 41 (sensor ID: a) is closer to the receiver R1 than the receiver R2, and the sensor 42 (sensor ID: b) is closer to the receiver R2 than the receiver R1". In this way, the difference between the relative distances to the receiver R1 and the receiver R2 is associated with the received intensity. This is the second characteristic. That is, the tire mount position detection system 100 can detect, namely identify the wheel position to which each of two sensors, which are determined to be located in the same region in Step S140, is mounted, by comparing the received intensity of the receiver R1 and the received intensity of the receive R2.

(3.3) Operation in Measurement Failure

As described above, a case in which the receiver R1 or the receiver R2 cannot exhibit its predetermined performance due to the failure might occur. For example, it is likely that receiving performance of one of the receivers is deteriorated due to an error relating to a mount position or a mount angle of the receiver.

Hereinafter, an example case in which the receiving performance of the receiver R2 is deteriorated compared to that of the receiver R1 is described. That is, it is a case in which the measurement value of the receiver R2 is smaller than the measurement value of the receiver R1 although the distances from a specific sensor are identical.

Further, the processes until Step S140 shown in FIG. 4 are finished, and the sensor 41 (sensor ID: a) and the sensor 42 (sensor ID: b) are determined to be located in the region α.

R1(a) is represented by the product of intensity (a) of the radio signal (radio wave) transmitted by the sensor 41 (sensor ID: a), an amount (Ln) attenuated until the radio signal arrives at the receiver, and a receiving rate (E1) of the receiver R1. Each of R1(a), R2(a), R1(b), and R2(b) is represented as below.

Formula 2

R1(a)=a×E1×Ln
R2(a)=a×E2×Lf
R1(b)=b×E1×Lf
R2(b)=b×E2×Ln

Since each of the mount positions of the sensors and the wheel positions are symmetry, the attenuation term (L) due to the distance is represented as (Ln) in a case in which the receiver is close to the sensor, or (Lf) in a case in which the receiver is far from the sensor. Further, the receiving rate E1 (E2) denotes a rate of the available radio signal received by the receiver R1 (R2) among the radio signal that arrives at the receiver R1 (R2). In a case in which a half of the radio signal is available among the radio signal transmitted at the predetermined intensity, the receiving rate is 0.5.

Even if the receiving performance of the receiver R2 is slightly low, there is no problem to determine the wheel position to which the sensor (tire) is mounted, as long as R1(a)>R2(a) and R1(b)<R2(b) are fulfilled. However, it is considered that, when the received intensity of the receiver R2 is low enough, R1(b)>R2(b) might be fulfilled.

It is a case in which the receiver R1, which is far away from the sensor 42 (sensor ID: b), receives a signal stronger than the receiver R2, which is close to the sensor 42 (sensor ID: b), because the receiving performance of the receiver R2 is deteriorated. In other words, "the magnitude relation of the received intensity of the sensor 42 (sensor ID: b), which is not normal and is close to the receiver, is inverted."

In this case, according to the detection logic described above, both of the sensor 41 (sensor ID: a) and the sensor 42 (sensor ID: b) are close to the receiver R1, and therefore the wheel position cannot be detected precisely. In order to solve such a problem, it is necessary to determine which inequality is correct among R1(a)>R2(a) and R1(b)>R2(b). In other words, "it is necessary to correctly determine which sensor among the sensor 41 (sensor ID: a) and the sensor 42 (sensor ID: b) is located at a side of the normal receiver."

Thus, the tire mount position detection system 100 compares the magnitude of R1(a)−R2(a) and the magnitude of R1(b)−R2(b) in the following way for the determination described above.

Formula 3 a R1 Ln−a R2 Lf−(b R1 Lf−b R2 Ln)
=R1 (a Ln−b Lf)−R2 (a Lf−b Ln)
>R2 (a Ln−b Lf)−R2 (a Lf−b Ln) ∵ R1>R2
=R2 (a (Ln−Lf)+b (Ln−Lf))
=R2 ((a+b) (Ln−Lf))>0 ∵ Ln>Lf

As obvious from this, the difference of the received intensity of the sensor 41 (sensor ID: a) is always large. Since the sensor 41 (sensor ID: a) is close to the normal receiver R1, it is proved that "the sensor having the larger difference of the received intensity is close to the normal receiver".

Thus, in a case in which R1(a)>R2(a) and R1(b)>R2(b), or R1(a)<R2(a) and R1(b)<R2(b) are fulfilled, the wheel position to which the sensor is mounted can be determined by using only the data of the sensor having the larger difference of the received intensity.

(4) Functions and Effects

According to the embodiment described above, the following functions and effects are obtained. Specifically, according to the tire mount position detection system 100, the wheel position to which the tire having the sensor is mounted is detected, based on the first signal intensity (for example, R1(a)), which is the intensity of the radio signal transmitted from the sensor (transmitter) and received by the receiver 110, the second signal intensity (for example, R2(a)), which is the intensity of the radio signal transmitted from the sensor (transmitter) and received by the receiver 120, and the total value (R1(a)+R2(a)) of the first signal intensity and the second signal intensity.

More specifically, it is determined that the sensor (transmitter) is located in which region α, β, or γ based on the magnitude relation of the total values, and then it is detected that the tire having the sensor (transmitter) is mounted to which wheel position within the determined region, based on the magnitude relation between the first signal intensity and the second signal intensity.

With this, the wheel position to which the tire (sensor) is mounted can be detected automatically, based only on a receiving state of the radio signal transmitted by the sensor. That is, a sensor that detects a rotation direction of the tire is not needed for detecting the wheel position to which each tire is mounted. With this, an increase of the cost and an increase of the failure rate of the system can be avoided.

That is, according to the tire mount position detection system 100, even if the tire to which the sensor is mounted is switched due to a tire rotation, the wheel position to which the tire (sensor) is mounted can be detected automatically. Furthermore, the wheel position to which the tire (sensor) is mounted can be detected automatically, based only on the receiving state of the radio signal transmitted by the sensor.

According to the present embodiment, the receiver 110 is arranged at one side (left side) with respect to the center line CL between the left wheel and the right wheel, and the receiver 120 is arranged at another side (right side) with respect to the center line CL. Further, each of the receiver 110 and the receiver 120 is arranged at the position whose distances from respective axles of the vehicle 10 are different to each other. With this, the intensity of the radio signal transmitted by each sensor is apt to be different, and this configuration facilitates the initial setting (see FIG. 3) of the tire mount position detection system 100.

In the present embodiment, even in a case in which R1(*a*)>R2(*a*) and R1(*b*)>R2(*b*) are fulfilled due to the failure of the receiver 120, the wheel position can be detected by using the signal intensity of the transmitter in which the difference between the first signal intensity (R1(*a*), R1(*b*)) and the second signal intensity (R2(*a*), R2(*b*)) is larger. With this, even in a case in which the receiving performance of one receiver is deteriorated, the wheel position to which the tire (sensor) is mounted can be detected precisely.

In the present embodiment, the radio signal transmitted by the sensor (transmitter) includes the identifier (sensor ID) that identifies the sensor (transmitter). With this, the tire mount position detection system 100 can identify the sensor transmitting the radio signal easily.

Second Embodiment

Next, other embodiment of the tire mount position detection system will be described. The vehicle 10 including the tire mount position detection system 100, and the functional block configuration of the tire mount position detection system 100 are similar to those shown in FIG. 1 and FIG. 2.

Hereinafter, a functional block of the tire mount position detection system 100 according to the present embodiment is described. The description of the functional block similar to that in the first embodiment is omitted.

A signal intensity calculation portion 230 according to the present embodiment also executes a calculation using the intensity of the radio signals measured by the first measurement portion 210 and the second measurement portion 220. It is preferable that the signal intensity calculation portion 230 uses an average of values measured plural times while the tire rotates one time because the positions of the sensors in the front-rear direction of the vehicle may be different depending on the rotation of the tire.

Specifically, the signal intensity calculation portion 230 calculates a total value (sum) of the intensity (first signal intensity) of the radio signal received by the receiver 110 and the intensity (second signal intensity) of the radio signal received by the receiver 120, for each sensor. In the present embodiment, the signal intensity calculation portion 230 is served as a calculation portion.

More specifically, the signal intensity calculation portion 230 calculates the total value (R1+R2) of the signal intensity described below, similar to the first embodiment.

Formula 4
R1(*a*)+R2(*a*)
R1(*b*)+R2(*b*)
R1(*c*)+R2(*c*)
R1(*d*)+R2(*d*)
R1(*e*)+R2(*e*)
R1(*f*)+R2(*f*)

FIG. 8 is a graph illustrating an example of the measured intensity of the radio signals and the calculation result. The signal intensity calculation portion 230 calculates the total value (R1+R2) shown in FIG. 8, for each sensor. The content of FIG. 8 is further described below.

Further, the signal intensity calculation portion 230 calculates an intensity ratio, which is a ratio using the first signal intensity and the second signal intensity, for each sensor. In the present embodiment, the signal intensity calculation portion 230 calculates a quotient of the first signal intensity and the second signal intensity as the intensity ratio for each sensor. Specifically, the signal intensity calculation portion 230 calculates the quotient (R1/R2) obtained by dividing the first signal intensity by the second signal intensity. More specifically, the signal intensity calculation portion 230 calculates the quotients (R1/R2) of the signal intensity described below.

Formula 5
R1(*a*)/R2(*a*)
R1(*b*)/R2(*b*)
R1(*c*)/R2(*c*)
R1(*d*)/R2(*d*)
R1(*e*)/R2(*e*)
R1(*f*)/R2(*f*)

The intensity ratio is not limited to R1/R2 as long as the ratio uses the first signal intensity and the second signal intensity. R2/R1 may be adopted as a quotient, or alternatively a formula such as (R1−R2)/(R1+R2) may be adopted as long as the values of R1 and R2 are made dimensionless.

The region determination portion 240 according to the present embodiment also determines that each sensor is located in which region in the vehicle 10, based on the magnitude relation between the total values (R1+R2) of the signal intensity calculated by the signal intensity calculation portion 230. That is, the region determination portion 240 specifies an approximate position of each sensor in the vehicle 10, based on the magnitude relation between the total values.

Specifically, the region determination portion 240 determines that the sensor is located in a front region of the vehicle 10 or a rear region of the vehicle 10, based on the magnitude relation of the total values. That is, the region determination portion 240 determines that each sensor is located in which region in a plane view of the vehicle 10 shown in FIG. 1.

As shown in FIG. 6, a region in the vehicle 10 is divided into a region α (front region) and a region β (rear region). The region α includes the wheel positions 1 and 2 (left front wheel and right front wheel). The region β includes the wheel positions 3, 4, 5 and 6 (left rear outer wheel, left rear inner wheel, right rear inner wheel, and right rear outer wheel).

The region determination portion 240 determines that which sensor is located in which region, based on the magnitude relation between the total values (R1+R2) shown in FIG. 8. Specifically, the wheel positions 1 and 2 are extremely close to the receiver 110 (R1) and the receiver 120

(R2), and therefore each of the total values R1(*a*)+R2(*a*) and R1(*b*)+R2(*b*) are larger than the total values (R1+R2) of other sensors. Accordingly, it can be determined that the sensor is located in the region α or the region β by using the total values (R1+R2).

The position detection portion 250 according to the present embodiment detects the wheel position to which the tire having the sensor is mounted, based on the first signal intensity, the second signal intensity, the total value, and the quotient of each sensor.

Specifically, the position detection portion 250 detects that the tire having the sensor is mounted to which wheel position (position 1 or 2) in the region α (front region), based on the magnitude relation between the first signal intensity and the second signal intensity.

That is, it can be determined that each of two sensors determined to be located in the region α by the region determination portion 240 is located at which wheel position (position) at a left side or a right side, based on the magnitude relation of the first signal intensity and the second signal intensity of the sensor. It is specifically because that, as shown in FIG. 6 and FIG. 8, since the sensor 41 (sensor ID: a) is located at the left side of the vehicle, the intensity (first signal intensity) of the radio signal received by the receiver 110 (R1) is larger than the intensity (second signal intensity) of the radio signal received by the receiver 120 (R2).

The position detection portion 250 according to the present embodiment also detects that the tire 31 having the sensor 41 (sensor ID: a) is mounted to the wheel position 1 within the region (region α), based on the magnitude relation between the first signal intensity (R1(*a*)) and the second signal intensity (R2(*a*)). The position detection portion 250 detects that other sensor (tire) is mounted to which wheel position, by means of a similar procedure.

Further, the position detection portion 250 detects that the tire having the sensor is mounted to which wheel position (position) within the region β (rear region), based on the quotient (R1/R2). Specifically, as shown in FIG. 6 and FIG. 8, the quotients R1/R2 fulfill an inequality of the quotient at the position 3>the quotient at the position 4>the quotient at the position 5>the quotient at the position 6. In FIG. 6 or the like, it is shown that the receiver R1 is the closest to the wheel position 4, however in actual, since the radio signal is affected by the transmission environment in the vehicle 10, in the present embodiment, the quotients R1/R2 fulfill the inequality of the quotient at the position 3>the quotient at the position 4>the quotient at the position 5>the quotient at the position 6.

Since the quotient R1/R2 denotes the ratio of "the intensity of the radio signal transmitted to the receiver 110 (R1) against the intensity of the radio signal transmitted to the receiver 120 (R2)", it can be determined that, as the quotient R1/R2 is larger, the sensor is closer to the receiver 110 (R1).

(3) Operation of Tire Mount Position Detection System

Next, operation of the tire mount position detection system 100 according to the present embodiment will be described. Specifically, a tire (sensor) position detection operation of the tire mount position detection system 100 will be described. The initial setting operation is similar to that in the first embodiment.

Figure 7:
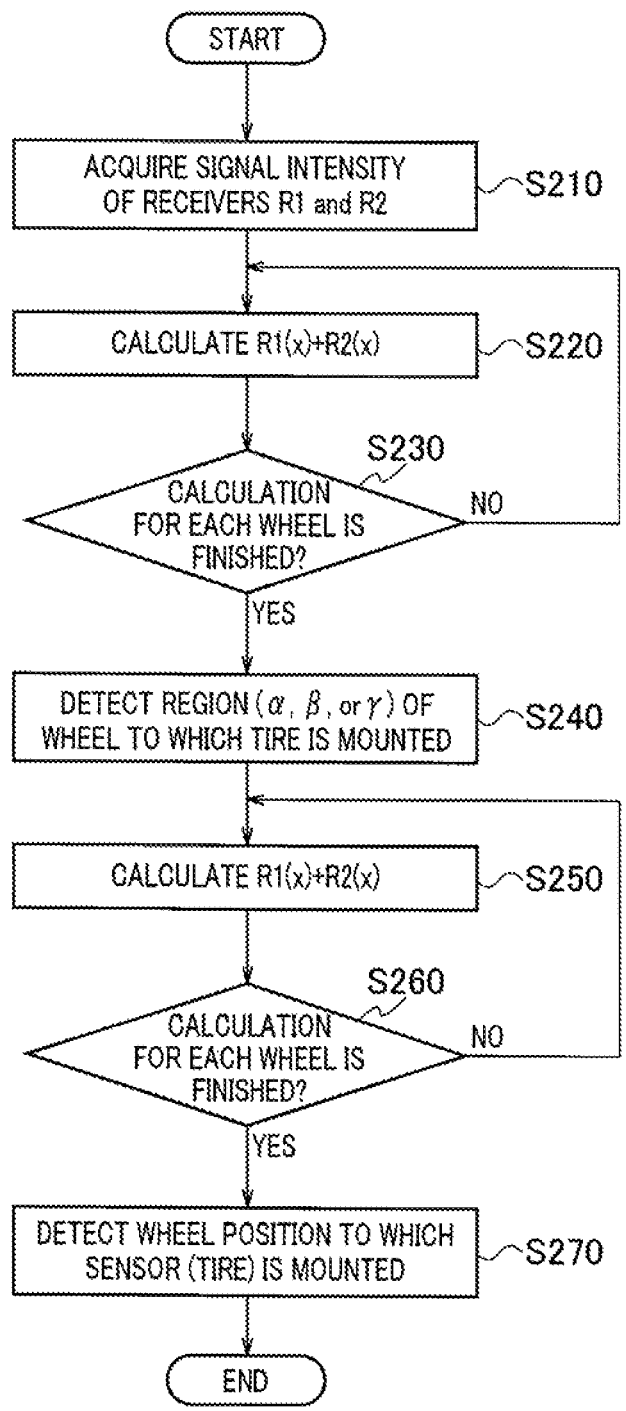
FIG. 7 is a flow chart illustrating a flow of a tire (sensor) position detection operation (second embodiment) of the tire mount position detection system 100.

FIG. 7 is a flow chart illustrating a flow of the tire (sensor) position detection operation of the tire mount position detection system 100. As shown in FIG. 7, the tire mount position detection system 100 acquires the signal intensity of the radio signal, which is transmitted by each sensor, received by the receiver R1 and the receiver R2 (S210).

The tire mount position detection system 100 calculates the total value of the signal intensity of the radio signal received by the receiver R1 and the signal intensity of the radio signal received by the receiver R2, for each sensor (S220). Here, the total value is described as R1(*x*)+R2 (*x*) (x denotes the sensor ID). The tire mount position detection system 100 repeats the calculation of the total value for each wheel (S230).

As shown in FIG. 8, the sum of the received intensity (R1(*x*)+R2(*x*)) (total value) is classified into two groups. Based on the configuration that the sensors 41 to 46 (sensor IDs: a to f) are installed (mounted) to the tires 31 to 36, the two groups correspond to two regions α and β depending on the distances from the receivers R1 and R2 (see FIG. 6).

The tire mount position detection system 100 determines that each sensor is located in which region α or β, based on the calculation result of the total value (S240). Specifically, as shown in FIG. 8, the tire mount position detection system 100 determines that the sensor 41 (sensor ID: a, total value: 4.96 V) and the sensor 42 (sensor ID: b, total value: 4.93 V) having the larger value of R1(*x*)+R2(*x*) are located in the region α.

Further, the tire mount position detection system 100 determines that other sensors (sensors 43 to 46) having R1(*x*)+R2(*x*) smaller than that of the sensors 41 and 42 are located in the region β.

Next, the tire mount position detection system 100 calculates the quotient (R1(*x*)/R2(*x*)) for each sensor (S250). The tire mount position detection system 100 repeats the calculation of the quotient for each wheel (S260). However, the sensor (sensors 41 and 42) determined as being located in the region α may be excluded from a target of the calculation.

The tire mount position detection system 100 detects the wheel position (positions 1 to 6) to which the sensor (tire) is mounted, for each sensor (S270).

Specifically, the tire mount position detection system 100 detects that each of the sensors 41 and 42, which are determined as being located in the region α, is located at which wheel position (position) at the left side and the right side. As shown in FIG. 8, regarding the sensor 41 (sensor ID: a), R1(*a*)>R2(*a*) is fulfilled. On the other hand, regarding the sensor 42 (sensor ID: b), R1(*b*)<R2(*b*) is fulfilled. Consequently, it is detected that the sensor 41 in which R1(*a*) is larger than R2(*a*) is located at the left side (position 1) of the vehicle and the sensor 42 in which R2(*b*) is larger than R1(*b*) is located at the right side (position 2) of the vehicle.

Further, the tire mount position detection system 100 detects that each of the sensors 43 to 46, which are determined as being located in the region β, is located at which wheel position (position) in the region β. As shown in FIG. 8, the value R1/R2 becomes small from the sensor 43 (sensor ID: c) to the sensor 44 (sensor ID: d), the sensor 45 (sensor ID: e), and the sensor 46 (sensor ID: f) in this order.

The tire mount position detection system 100 detects that the sensor having the largest value of R1/R2 (1.12) is located at the position 3, which is the closest position to the receiver 110 (R1) (transmission loss of the radio signal until the radio signal arrives at the receiver R1 is the smallest). Similarly, the tire mount position detection system 100 detects that the sensor 44 having the second largest value of R1/R2 (1.07) is located at the position 4, the sensor 45 having the third largest value of R1/R2 (0.99) is located at the position 5, and the sensor 46 having the smallest value of R1/R2 (0.92) is located at the position 6.

(4) Functions and Effects

According to the embodiment described above, the following functions and effects are obtained. Specifically, according to the tire mount position detection system 100, the wheel position to which the tire having the sensor is mounted is detected, based on the total value ($R1(x)+R2(x)$) of the first signal intensity ($R1(x)$), which is the intensity of the radio signal transmitted from the sensor (transmitter) and received by the receiver 110, and the second signal intensity ($R2(x)$), which is the intensity of the radio signal transmitted from the sensor (transmitter) and received by the receiver 120, and the quotient ($R1(x)/R2(x)$) of the first signal intensity and the second signal intensity.

More specifically, it is determined that the sensor (transmitter) is located in which region α, or β, based on the magnitude relation of the total values. And then, it is detected that the tire having the sensor (transmitter) is mounted to which wheel position within the region α, based on the magnitude relation between the first signal intensity and the second signal intensity, and it is detected that the tire having the sensor is mounted to which wheel position within the region β, based on the quotient.

The present embodiment adopts the quotient (R1/R2). With this, even in a case in which the intensity (output) of the radio signal transmitted by each sensor is varied, the influence of the variation can be avoided. By using the ratio R1/R2, the influence of the variation can be decreased compared to a configuration merely using an absolute value of the intensity of the radio signal, and thereby the wheel position can be detected more precisely.

In the present embodiment, the vehicle 10 is supposed as a large vehicle such as a mine vehicle. Accordingly, even in the vehicle such as a mine vehicle having a long distance between the sensor and the receiver and having a structure (fuel tank, thick tire, or the like) that largely affects the transmission environment of the radio signal, the wheel position to which the tire (sensor) is mounted can be detected more precisely.

Other Embodiments

As described above, the contents of the present invention are described with reference to the examples, however the present invention is not limited to those descriptions. It is obvious for a person skilled in the art to adopt various modifications and improvement.

For example, in the embodiments described above, the vehicle 10 having the front axle 21 and the rear axle 22 (double tire) is described as an example, however the present invention can be applied to other kind of vehicles.

Figure 9:
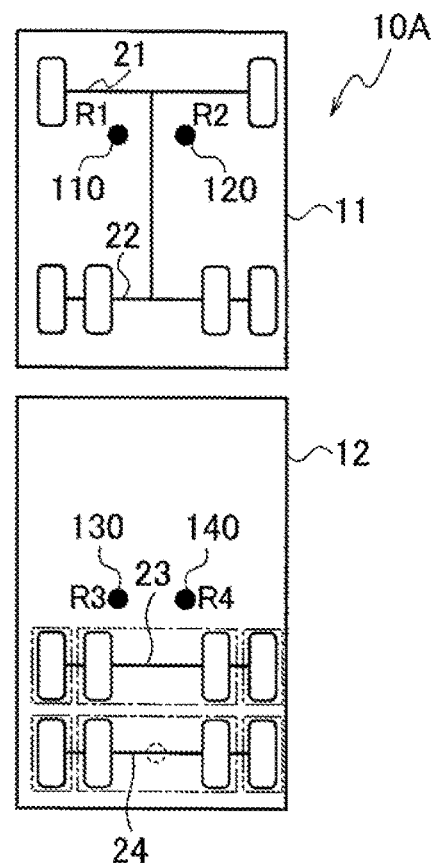
FIG. 9 is a schematic plane view of a vehicle 10A according to other embodiment.

FIG. 9 is a schematic plane view of a vehicle 10A according to other embodiment. As shown in FIG. 9, the vehicle 10A is provided with a tractor 11 and a trailer 12.

The tractor 11 has a front axle 21 and a rear axle 22 (double tire). The trailer 12 has a trailer front axle 23 and a trailer rear axle 24. That is, the vehicle 10A is formed as a semi-trailer.

In the vehicle 10A, a receiver 110 and a receiver 120 are arranged in the tractor 11, similar to the vehicle 10. Further, a receiver 130 and a receiver 140 are arranged in the trailer 12. Specifically, the receiver 130 and the receiver 140 are arranged adjacent to a front of the trailer front axle 23. More specifically, the receiver 130 is arranged at an inner side of the vehicle with respect to the front of a left wheel of the trailer front axle 23, and the receiver 140 is arranged at the inner side of the vehicle with respect to the front of a right wheel of the trailer front axle 23.

Eight wheel positions of the trailer 12 are identified by four regions shown in FIG. 9, specifically two regions surrounded by a one-dot chain line (a side of the trailer front axle 23 and a side of the trailer rear axle 24) and two regions surrounded by a two-dot chain line (a side of the trailer front axle 23 and a side of the trailer rear axle 24).

Further, a receiver (illustrated by a dotted line in FIG. 9) may be added at a center portion of the trailer rear axle 24 in a vehicle width direction in order to improve the detection accuracy of the wheel position. This receiver can derive the improvement of the accuracy for determining the region, however the receiver cannot derive the improvement of the accuracy for detecting the wheel position within the region because the distances from the respective wheel positions are identical.

Figure 10:
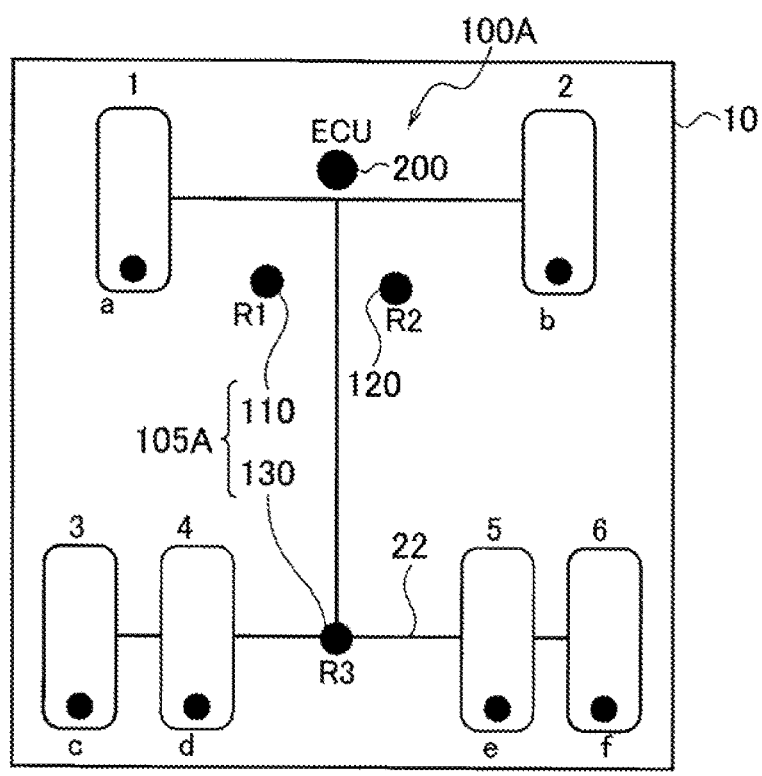
FIG. 10 is a schematic plane view of a vehicle 10 including a tire mount position detection system 100A according to other embodiment.

Further, three or more receivers may be arranged also in the vehicle 10. FIG. 10 is a schematic plane view of a vehicle 10 including a tire mount position detection system 100A according to other embodiment.

As shown in FIG. 10, the tire mount position detection system 100A is provided with a receiver unit 105A. The receiver unit 105A is formed by three receivers, specifically a receiver 110, a receiver 120, and a receiver 130 (R3).

The receiver 130 is arranged at or adjacent to a center portion of a rear axle 22 in a vehicle width direction. The tire mount position detection system 100A detects the wheel position to which each sensor (tire) is mounted, based on the intensity of the radio signal received by the receiver 110, the receiver 120, and the receiver 130. Here, data of the intensity of the radio signal received by the receiver 130 may be used supplementarily, for example, to improve the detection accuracy of the wheel position by the receiver 110 and the receiver 120. Specifically, by using the receiver 130, the accuracy for distinguishing the region β and the region γ can be improved. However, since the distances of the receiver 130 from the wheel positions 4 and 5 (left rear inner wheel and right rear inner wheel) are identical and the distances of the receiver 130 from the wheel positions 3 and 6 (left rear outer wheel and right rear outer wheel) are identical, the receiver 130 does not derive the improvement of the accuracy for detecting the wheel position.

Figure 11:
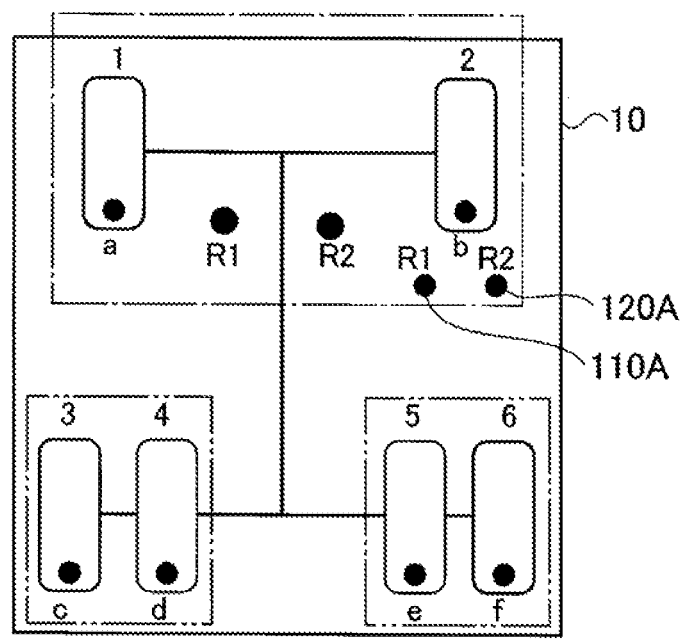
FIG. 11 is a schematic plane view of a vehicle 10 illustrating an arrangement example of a receiver 110A and a receiver 120A according to other embodiment.

Further, the position where the receiver is arranged in the vehicle 10 may be modified as below. FIG. 11 is a schematic plane view of a vehicle 10 illustrating an arrangement example of a receiver 110A and a receiver 120A according to other embodiment.

As shown in FIG. 11, both of the receiver 110A (first receiver) and the receiver 120A (second receiver) are arranged at a side of the wheel position 2 (right front wheel), namely arranged at one side with respect to the center line CL (see FIG. 1).

In this case, the wheel position is detected in a region illustrated by a one-dot chain line or a region illustrated by a two-dot chain line shown in FIG. 11. Although the detection accuracy of the wheel position may be deteriorated compared to the arrangement example of the receiver 110 and the receiver 120 shown in FIG. 1, the wheel position can be also detected by the arrangement example of the receivers shown in FIG. 11.

Further, in the embodiments described above, the receiver 110 and the receiver 120 are arranged at the same position in the front-rear direction (longitudinal direction) of the vehicle 10, namely arranged to be aligned in the vehicle width direction, however the receiver 110 and the receiver 120 may be arranged at different positions in the front-rear direction of the vehicle 10. That is, the receiver 110 and the receiver 120 may be offset to each other in the front-rear direction of the vehicle 10. However, it is preferable that a structure (axle configuration) in the front-rear direction of the vehicle is symmetry like the vehicle 10 or the tractor 11.

Further, in the embodiments described above, two wheels are included in each region, however three or more wheels may be included in each region. For example, the wheel, which is the closest to the receiver 110 (R1) (the intensity of the radio wave is the strongest), may be set as a wheel position 1, and the wheel, which is the second closest to the receiver 110 (R1), may be set as a wheel position 4.

In the embodiments described above, the position detection device 200 is installed as a part of the electronic control unit (ECU) mounted to the vehicle 10, however the function achieved by the position detection device 200 may be provided at an outside of the vehicle 10.

Figure 12:
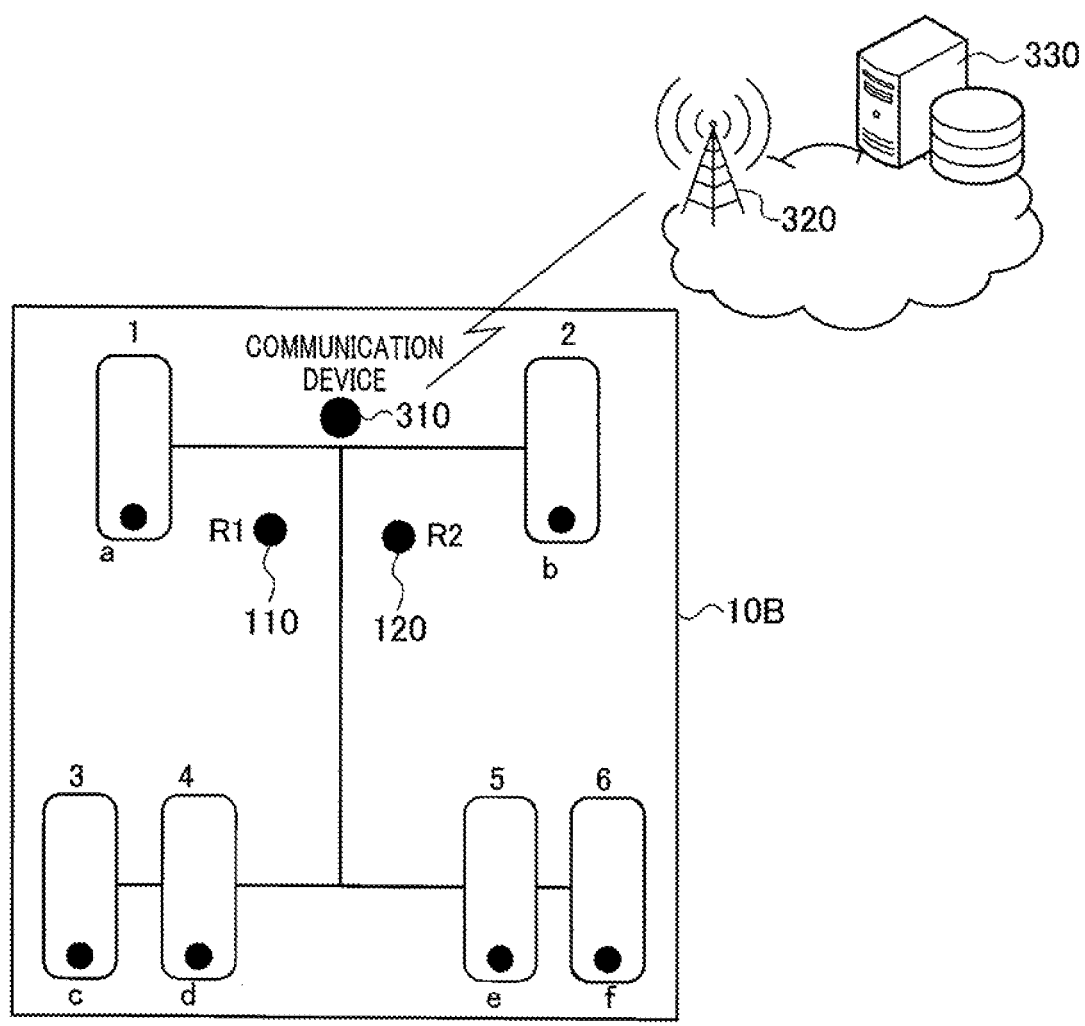
FIG. 12 is a schematic network configuration view including a schematic plane view of a vehicle 10B according to another embodiment.

FIG. 12 is a schematic network configuration view including a schematic plane view of a vehicle 10B according to another embodiment. As shown in FIG. 12, the vehicle 10B is provided a communication device 310 instead of the position detection device 200.

The communication device 310 can execute radio communication with a radio base station 320. The communication device 310 is formed by, for example, a radio communication terminal connectable to a mobile communication network (LTE or the like).

A server computer 330 is arranged on the communication network so as to achieve the functions (the first measurement portion 210, the second measurement portion 220, the signal intensity calculation portion 230, the region determination portion 240, and the position detection portion 250), which are achieved by the position detection device 200 as described above.

Further, a program (software) that achieves the functions may be stored on the communication network in a downloadable state, or may be provided by a storage medium in which the program is stored.

Further, in the embodiments described above, the region determination portion 240 is arranged, however the position detection portion 250 may be formed to directly detect the wheel position to which each sensor is mounted, without arranging the region determination portion 240.

Further, in the embodiments described above, the radio signal transmitted by the sensor (transmitter) includes the identifier (sensor ID) that identifies the sensor (transmitter), however such an identifier is not always needed in a case in which the sensor can be identified by other method (for example, a method using a frequency band, a channel number or the like).

Further, in the embodiments described above, the quotient R1/R2 is adopted as the quotient of the first signal intensity and the second signal intensity, however a quotient R2/R1 may be adopted instead of the quotient R1/R2. In a case in which the quotient R2/R1 is adopted, the inequality of the quotient at the position 6>the quotient at the position 5>the quotient at the position 4>the quotient at the position 3 is fulfilled, however a similar result can be obtained.

As described above, the embodiments of the present invention are described, however the present invention is not limited to the description and the drawings forming a part of the present disclosure. Various modifications, examples, and operation techniques will be apparent from the present disclosure to a person skilled in the art.

INDUSTRIAL APPLICABILITY

The tire mount position detection system, the tire mount position detection method, and the tire mount position detection program described above are useful to automatically detect the wheel position to which the tire (sensor) is mounted, based only on the receiving state of the radio signal transmitted by the transmitter.

REFERENCE SIGNS LIST 10, 10A, 10B: vehicle
11: tractor
12: trailer
21: front axle
22: rear axle
23: trailer front axle
24: trailer rear axle
31 to 36: tire
41 to 46: sensor
100, 100A: tire mount position detection system
105, 105A: receiver unit
110, 110A, 120, 120A, 130, 140: receiver
200: position detection device
210: first measurement portion
220: second measurement portion
230: signal intensity calculation portion
240: region determination portion
250: position detection portion
310: communication device
320: radio base station
330: server computer

The invention claimed is:

1. A tire mount position detection system that detects each tire having a transmitter is mounted to which wheel position in a vehicle, the tire mount position detection system comprising:
    a receiver unit arranged in the vehicle to receive a radio signal transmitted by the transmitter, the receiver unit comprising at least a first receiver, and a second receiver arranged at a position different from a position of the first receiver;
    a first measurement portion that measures first signal intensity, which is intensity of the radio signal received by the first receiver, for each transmitter;
    a second measurement portion that measures second signal intensity, which is intensity of the radio signal received by the second receiver, for each transmitter;
    a calculation portion that calculates a total value of the first signal intensity and the second signal intensity, for each transmitter; and
    a position detection portion that detects the wheel position to which the tire having the transmitter is mounted, based on the first signal intensity, the second signal intensity, and the total value of each transmitter.

2. The tire mount position detection system according to claim 1, further comprising a region determination portion that determines that the transmitter is located in which region in a front-rear direction and a left-right direction of the vehicle, based on a magnitude relation of the total values,
    wherein the position detection portion detects the tire having the transmitter is mounted to which wheel position in the region, based on a magnitude relation of the first signal intensity and a second signal intensity.

3. The tire mount position detection system according to claim 1, wherein:
    the calculation portion calculates the total value of the first signal intensity and the second signal intensity, and an intensity ratio, which is a ratio using the first signal intensity and the second signal intensity, for each transmitter; and the position detection portion detects the wheel position to which the tire having the transmitter is mounted, based on the first signal intensity, the second signal intensity, the total value, and the intensity ratio of each transmitter.

4. The tire mount position detection system according to claim 3 further comprising a region determination portion that determines that the transmitter is located in a front region of the vehicle or a rear region of the vehicle, based on a magnitude relation of the total values,
wherein the position detection portion detects that the tire having the transmitter is mounted to which wheel position in the front region, based on the magnitude relation of the first signal intensity and the second signal intensity, and
the position detection portion detects that the tire having the transmitter is mounted to which wheel position in the rear region, based on the intensity ratio.

5. The tire mount position detection system according to any one of claim 1, wherein the first receiver is arranged at one side with respect to a center line between a left wheel and a right wheel, and the second receiver is arranged at another side with respect to the center line.

6. The tire mount position detection system according to any one of claim 1, wherein each of the first receiver and the second receiver is arranged at a position whose distances from respective axles of the vehicle are different to each other.

7. The tire mount position detection system according to claim 1, wherein, in a case in which the magnitude relation of the first signal intensity and the second signal intensity of the radio signal transmitted by a first transmitter mounted to a predetermined wheel position and the magnitude relation of the first signal intensity and the second signal intensity of the radio signal transmitted by a second transmitter mounted to a wheel position opposite to the predetermined wheel position in a left-right direction or a front-rear direction of the vehicle are similar to each other, the position detection portion detects the wheel positions to which the tire having the first transmitter and the tire having the second transmitter are mounted respectively, by using the signal intensity of the transmitter in which a difference between the first signal intensity and the second signal intensity is larger, among the first transmitter and the second transmitter.

8. The tire mount position detection system according to any one of claim 1, wherein the radio signal transmitted by the transmitter includes an identifier that identifies the transmitter.

9. A tire mount position detection method that detects each tire having a transmitter is mounted to which wheel position in a vehicle, the tire mount position detection method comprising: by using a receiver unit arranged in the vehicle to receive a radio signal transmitted by the transmitter, the receiver unit comprising at least a first receiver, and a second receiver arranged at a position different from a position of the first receiver,
measuring first signal intensity, which is intensity of the radio signal received by the first receiver, for each transmitter;
measuring second signal intensity, which is intensity of the radio signal received by the second receiver, for each transmitter;
calculating a total value of the first signal intensity and the second signal intensity, for each transmitter; and
detecting the wheel position to which the tire having the transmitter is mounted, based on the first signal intensity, the second signal intensity, and the total value of each transmitter.

10. The tire mount position detection method according to claim 9, wherein:
the calculating the total value includes calculating the total value of the first signal intensity and the second signal intensity and calculating an intensity ratio, which is a ratio using the first signal intensity and the second signal intensity, for each transmitter; and
the detecting the wheel position includes detecting the wheel position to which the tire having the transmitter is mounted, based on the first signal intensity, the second signal intensity, the total value, and the intensity ratio of each transmitter.

11. A tire mount position detection program embodied on a non-transitory computer readable medium that detects each tire having a transmitter is mounted to which wheel position in a vehicle, the vehicle including a receiver unit arranged in the vehicle to receive a radio signal transmitted by the transmitter, the receiver unit comprising at least a first receiver, and a second receiver arranged at a position different from a position of the first receiver, the tire mount position detection program causing a computer to execute:
a process that measures first signal intensity, which is intensity of the radio signal received by the first receiver, for each transmitter;
a process that measures second signal intensity, which is intensity of the radio signal received by the second receiver, for each transmitter;
a process that calculates a total value of the first signal intensity and the second signal intensity, for each transmitter; and
a process that detects the wheel position to which the tire having the transmitter is mounted, based on the first signal intensity, the second signal intensity, and the total value of each transmitter.

12. The tire mount position detection program embodied on a non-transitory computer readable medium according to claim 11, wherein:
the process that calculates the total value calculates the total value of the first signal intensity and the second signal intensity and calculates an intensity ratio, which is a ratio using the first signal intensity and the second signal intensity, for each transmitter; and
the process that detects the wheel position detects the wheel position to which the tire having the transmitter is mounted, based on the first signal intensity, the second signal intensity, the total value, and the intensity ratio of each transmitter.

* * * * *